(12) United States Patent
Leidefeldt et al.

(10) Patent No.: US 11,850,936 B2
(45) Date of Patent: Dec. 26, 2023

(54) GAS TANK ARRANGEMENT

(71) Applicant: Volvo Truck Corporation, Gothenburg (SE)

(72) Inventors: Marcus Leidefeldt, Gothenburg (SE); Sigurd Sonderegger, Askim (SE)

(73) Assignee: Volvo Truck Corporation, Gothenburg (SE)

( * ) Notice: Subject to any disclaimer, the term of this patent is extended or adjusted under 35 U.S.C. 154(b) by 1409 days.

(21) Appl. No.: 16/310,051

(22) PCT Filed: Jun. 15, 2016

(86) PCT No.: PCT/EP2016/063743
§ 371 (c)(1),
(2) Date: Dec. 14, 2018

(87) PCT Pub. No.: WO2017/215748
PCT Pub. Date: Dec. 21, 2017

(65) Prior Publication Data
US 2019/0143809 A1    May 16, 2019

(51) Int. Cl.
*B60K 15/01*        (2006.01)
*B60K 15/035*       (2006.01)
(Continued)

(52) U.S. Cl.
CPC .......... *B60K 15/013* (2013.01); *B60K 15/035* (2013.01); *B60K 15/07* (2013.01);
(Continued)

(58) Field of Classification Search
CPC .... B60K 15/013; B60K 15/035; B60K 15/07; B60K 15/03006; B60K 25/00;
(Continued)

(56) References Cited

U.S. PATENT DOCUMENTS 5,188,519 A * 2/1993 Spulgis ................. F04B 53/122
                                                    417/511
5,445,018 A * 8/1995 Harpster ................ F02M 53/00
                                                    73/114.52
(Continued)

FOREIGN PATENT DOCUMENTS

CN      101509447 A     8/2009
CN      101749096 A     6/2010
(Continued)

OTHER PUBLICATIONS

Maria Andronic, Stirling Engine, May 18, 2014, Suffolk.edu, p. 1, https://sites.suffolk.edu/mmandronic/2014/05/18/stirling-engine/ (Year: 2014).*

(Continued)

*Primary Examiner* — Jacob D Knutson
*Assistant Examiner* — Abigail R Hymel
(74) *Attorney, Agent, or Firm* — Withrow & Terranova, PLLC

(57) ABSTRACT

The present invention relates to a gas tank arrangement (100) for an internal combustion engine (102), said gas tank arrangement (100) comprising a gas tank (104) for containing a combustible gas, a first fuel pump (106) arranged downstream said gas tank (104) and arranged to increase the pressure level of the combustible gas to a first pressure level, wherein the gas tank arrangement (100) further comprises a second fuel pump (108) arranged downstream the first fuel pump (106) and arranged to increase the pressure level of the combustible gas to a second pressure level, wherein said second pressure level is higher than said first pressure level.

19 Claims, 3 Drawing Sheets

(51) Int. Cl.
*B60K 15/07* (2006.01)
*B60K 15/063* (2006.01)
*B60K 15/03* (2006.01)
*B60K 25/00* (2006.01)

(52) U.S. Cl.
CPC ........ *B60K 15/03006* (2013.01); *B60K 25/00* (2013.01); *B60K 2015/03243* (2013.01); *B60K 2015/0636* (2013.01); *B60Y 2200/14* (2013.01); *B60Y 2200/145* (2013.01)

(58) Field of Classification Search
CPC .. B60K 2015/03243; B60K 2015/0636; B60Y 2200/14; B60Y 2200/145; F17C 7/04; F17C 5/007; F17C 5/06; F17C 2227/0128; F17C 2227/0135; F17C 2227/0185; F02M 37/0076
See application file for complete search history.

(56) References Cited

U.S. PATENT DOCUMENTS

| | | | | |
|---|---|---|---|---|
| 5,708,201 | A * | 1/1998 | Kaub | F02M 37/0052 340/439 |
| 9,010,105 | B1 * | 4/2015 | Bennett | B60K 17/14 60/486 |
| 9,915,251 | B2 * | 3/2018 | Coldren | F04B 15/08 |
| 2003/0110780 | A1 * | 6/2003 | Enomoto | F02M 21/0254 62/7 |
| 2003/0183205 | A1 * | 10/2003 | Mudway | F02M 37/18 123/497 |
| 2003/0187565 | A1 | 10/2003 | Wong | |
| 2013/0032124 | A1 * | 2/2013 | Jang | F02M 33/08 123/456 |
| 2013/0333668 | A1 * | 12/2013 | Coldren | F02M 37/04 123/456 |
| 2014/0165568 | A1 * | 6/2014 | Foege | F17C 3/04 60/698 |
| 2014/0182553 | A1 | 7/2014 | Lee | |
| 2015/0330960 | A1 * | 11/2015 | Christensen | F02D 41/3845 73/37 |
| 2016/0123290 | A1 * | 5/2016 | Yudanov | F02M 63/005 123/445 |
| 2017/0051701 | A1 * | 2/2017 | Pursifull | F02M 37/06 |
| 2018/0304740 | A1 * | 10/2018 | Sonderegger | F02M 37/0082 |
| 2018/0372273 | A1 * | 12/2018 | Sonderegger | F17C 7/04 |
| 2019/0143809 | A1 * | 5/2019 | Leidefeldt | B60K 15/035 280/830 |
| 2019/0338713 | A1 * | 11/2019 | Leidefeldt | F02D 19/02 |
| 2020/0025337 | A1 * | 1/2020 | Andersson | F01N 3/0205 |
| 2020/0080519 | A1 * | 3/2020 | Leidefeldt | F02M 21/06 |
| 2020/0378345 | A1 * | 12/2020 | Dudar | F02M 25/089 |

FOREIGN PATENT DOCUMENTS

| | | | | |
|---|---|---|---|---|
| CN | 103912407 | A | 7/2014 | |
| CN | 104704229 | A | 6/2015 | |
| EP | 2816215 | A1 * | 12/2014 | ............ B60K 25/00 |
| JP | 2004346813 | A | 12/2004 | |
| RU | 156745 | U1 | 11/2015 | |
| WO | 2007087963 | A1 | 8/2007 | |
| WO | 2014183915 | A1 | 11/2014 | |
| WO | 2015114081 | A1 | 8/2015 | |

OTHER PUBLICATIONS

York, A. Tsolakis, Cleaner Vehicle Emissions, 2010, Encyclopedia of Materials: Science and Technology, Paragraph 3.1, https://www.sciencedirect.com/topics/engineering/diesel-oxidation-catalyst (Year: 2010).*
Notification to Grant for Chinese Patent Application No. 201680086655.2, dated Feb. 8, 2022, 6 pages.
First Office Action for Chinese Patent Application No. 201680086655.2, dated Aug. 10, 2021, 9 pages.
International Preliminary Report on Patentability for PCT/EP2016/063743, dated Jun. 7, 2018, 7 pages.
International Search Report and Written Opinion for PCT/EP2016/063743, dated Mar. 14, 2017, 12 pages.

* cited by examiner

GAS TANK ARRANGEMENT

This application is a 35 USC 371 National Phase filing of International Application No. PCT/EP2016/063743, filed Jun. 15, 2016, the disclosure of which is incorporated herein by reference in its entirety.

TECHNICAL FIELD

The present invention relates to a gas tank arrangement for an internal combustion engine. The invention also relates to a vehicle comprising such a gas tank arrangement. The invention is applicable on vehicles, in particularly low, medium and heavy duty vehicles commonly referred to as trucks. Although the invention will mainly be described in relation to a truck, it may also be applicable for other type of vehicles such as e.g. working machines, buses, boats etc.

BACKGROUND

In relation to propulsion systems for heavy duty vehicles, internal combustion engines are frequently used. These internal combustion engines are most often propelled by a combustible fluid such as e.g. diesel or petrol. However, in order to further reduce engine emissions of the vehicles, alternative propulsion methods and/or fuels are being used, either alone or in combination with the well known combustible fluids. These may include, for example, ethanol or electrical propulsion from an electric machine, etc.

As a further alternative, a combustible gas, such as e.g. compressed natural gas, DME, biogas, etc. has been found a suitable propulsion fuel for vehicles in the form of trucks. The combustible fluids can be used in combination with the combustible gas for propelling the internal combustion engine, in the following also referred to as a dual fuel internal combustion engine. Since the residuals from the combustible gas are relatively environmentally friendly in comparison to e.g. diesel fuel, pollution from the emissions thereof is reduced for these types of engines.

A problem with engines being propelled by the above described combustible gas is that if leakage of gas occurs from e.g. the gas tank or other positions of the system prior to combustion thereof, there is a risk of green house gas emission. Unwanted leakage of this kind also has an economical aspect since the fuel consumption will increase. A further problem is that the combustible gas needs to be pressurized to relatively high pressure levels before being provided to the fuel injectors of the engine. Hereby, there is a need to provide high-pressure pipes for transporting the high-pressure fuel, which high-pressure pipes are difficult to install, etc. There is thus a need to further improve the gas tank arrangements for dual fuel internal combustion engines.

SUMMARY

It is an object of the present invention to provide a gas tank arrangement which at least partially overcomes the deficiencies of the prior art. This is achieved by a gas tank arrangement according to claim 1.

According to a first aspect of the present invention, there is provided a gas tank arrangement for an internal combustion engine, the gas tank arrangement comprising a gas tank for containing a combustible gas, a first fuel pump arranged downstream the gas tank and arranged to increase the pressure level of the combustible gas to a first pressure level, wherein the gas tank arrangement further comprises a second fuel pump arranged downstream the first fuel pump and arranged to increase the pressure level of the combustible gas to a second pressure level, wherein the second pressure level is higher than the first pressure level.

The wording "combustible gas" should in the following and throughout the entire description be interpreted as a gas which can be ignited, either self-ignited by compression or be ignited by e.g. a spark plug. The invention should thus not be limited to any specific combustible gas. However, as a non-limiting example, the combustible gas may be natural gas. Other alternatives are of course conceivable such as e.g. DME, biogas, ethane propane, and other flammable hydrocarbon derivatives as well as hydrogen and mixtures thereof, etc. The combustible gas which can be provided in the gas tank can be in liquid phase and in gas phase. Hence, the wording "combustible gas" should be interpreted to include liquefied gas as well as gas in gas phase. Accordingly, a lower portion of the gas tank can be provided with liquid combustible gas while an upper portion of the gas tank can be provided with combustible gas in gas phase.

The first pressure level should preferably be understood as a low-pressure level which means that the combustible gas from the gas tank is increased to a level suitable for directing the combustible towards the internal combustion engine. As a non-limiting example, the pressure level in the gas tank may be approximately 10 bar, while the pressure level can be increased to approximately 50 bar by means of the first fuel pump. Conversely, the second pressure level should preferably be understood as a high-pressure level, which pressure level of the combustible gas is suitable for delivery to a fuel injection system of the internal combustion engine. As a non-limiting example, the second pressure level may be e.g. approximately 250-500 bar.

An advantage of the present invention is that the gas tank arrangement can be divided into a low-pressure section and a high-pressure section. Hereby, the high-pressure section can be arranged in close proximity to the internal combustion engine which has the advantage that the routing of high-pressure pipes can be reduced. As high-pressure pipes are difficult to install it is thus advantageous to reduce the length of such pipes. Also, when using high-pressure hoses, the bending radius becomes relatively large which thus makes the routing path difficult if the length of the hose is relatively large. Accordingly, an advantageous minimized high-pressure system is provided.

Still further, using a low-pressure section will provide for a reduced safety risk as there is a reduced need for couplings/clutches which has a risk of failure when exposed to relatively high pressure. The low-pressure section and the high-pressure section also enables for simplified manufacturing of the gas tank arrangement as two modules can be produced separately and thereafter easily connected to each other. Also, providing the high-pressure section relatively far away from the gas tank reduces the heat transmission to the relatively cold combustible gas.

According to an example embodiment, the gas tank arrangement may further comprise a fuel pump propulsion arrangement connected to the first fuel pump for propulsion thereof.

Hereby, the first fuel pump is controlled and operated by the fuel pump propulsion arrangement in order to provide a sufficient increase in fuel pressure. The fuel pump propulsion arrangement may be e.g. an engine propelled by a combustible gas, or a Stirling engine as will be described below, or an electric motor, etc.

According to an example embodiment, the fuel pump propulsion arrangement may comprise a piston, wherein the first fuel pump comprises a flywheel, the piston being mechanically connected to the flywheel for propulsion of the first fuel pump.

Thus, the piston is arranged for providing a reciprocating motion which is transferred to the flywheel of the first fuel pump for operation thereof.

According to an example embodiment, the fuel pump propulsion arrangement may comprise a first side portion arranged in downstream communication with the first fuel pump, and a second side portion, wherein the piston is arranged between the first side portion and the second side portion for providing a reciprocating motion there between.

Hereby, the first side portion is arranged as a relatively cold side portion, while the second side portion can be arranged as relatively warm side portion, as will be described further below. By means of such temperature difference, the piston can be arranged to provide a reciprocating motion between the first and second side portions without the need of providing an additional energy, such as petrol or diesel, to the fuel pump propulsion arrangement.

The first side portion may thus receive pressurized combustible gas from the first fuel pump, which pressurized combustible gas is relatively cold. According to a non-limiting example, the temperature of such pressurized combustible gas may be approximately minus 130 degrees Celsius. The first side portion may be arranged as a cylinder or the like and provided with a coil or other means of heat exchanger for directing the relatively cold combustible gas there through.

The second side portion may be arranged to receive ambient air which is thus warmer than the pressurized combustible gas of the first side portion. The second side portion may also be arranged in connection to an additional gas tank, which additional gas tank is described further below. The second side portion may be arranged as a cylinder or the like, wherein a conduit receiving ambient air or gas from the additional gas tank is arranged inside the cylinder of the second side portion.

According to an example embodiment, the second side portion may comprise a heating means for heating the second side portion to a temperature higher than a temperature level of the first side portion.

The heating means is thus arranged to heat the second side portion to provide an even further increased temperature difference between the first side portion and the second side portion. Hereby, the operation of the piston will be further improved.

The heating means may, for example, be a conventional burner arranged to heat the ambient air or the gas from the additional gas tank. Other alternatives are of course conceivable, such as e.g. a flame free oxidation process, etc.

According to an example embodiment, the gas tank arrangement may further comprise an after treatment system arranged in downstream fluid communication with the fuel pump propulsion arrangement.

Hereby, a reduction of e.g. greenhouse gases can be achieved.

According to an example embodiment, the after treatment system may be arranged in downstream fluid communication with the second side portion of the fuel pump propulsion arrangement.

As described above, the second side portion may be arranged in connection to an additional gas tank. Hereby, the after treatment system is also arranged downstream the additional gas tank and thus reduces emissions from this additional gas tank.

According to an example embodiment, the after treatment system may be arranged in downstream fluid communication with an internal combustion engine.

An advantage is that the same after treatment system can be used for both the gas tank arrangement as well as for the internal combustion engine.

According to an example embodiment, the after treatment system may be a catalyst.

According to an example embodiment, the fuel pump propulsion arrangement may be a Stirling engine.

A Sterling engine is advantageous as it provides for a closed-cycle regenerative heat engine where the working fluid is provided from the first and second side portions described above. Also a Stirling engine can utilize a cold gas to create a large temperature difference relative to the warm side. This temperature difference provides for an improved reciprocating motion of the Sterling engine piston. Hereby, no additional energy source is needed for propelling the piston.

According to an example embodiment, the gas tank arrangement may further comprise an additional gas tank in downstream fluid communication with the gas tank.

The additional gas tank is preferably arranged in connection to an upper portion of the gas tank. An advantage is that excessive gas in gas phase from the gas tank can be directed to the additional gas tank. The additional gas tank can thus be arranged as a vent tank for the gas tank. Hence, if the gas pressure in the gas tank exceeds a predetermined threshold limit, the gas is directed to the additional gas tank which thereby reduces the pressure level in the gas tank.

According to an example embodiment, the gas tank arrangement may further comprise an additional gas tank in downstream fluid communication with the first fuel pump.

Hereby, also pressurized combustible gas from the first fuel pump can be directed to the additional gas tank. The additional gas tank may hence be arranged in downstream fluid communication with the gas tank and the first fuel pump by means of a respective conduit.

According to an example embodiment, the additional gas tank may be arranged in upstream fluid communication with the fuel pump propulsion arrangement.

An advantage is that the additional gas tank can be used as a power source for the fuel pump propulsion arrangement.

According to an example embodiment, the additional gas tank may be arranged in upstream fluid communication with the second side portion of the fuel pump propulsion arrangement.

As described above, the combustible gas in the additional gas tank may be provided to the second side portion for enabling propulsion of the fuel pump propulsion arrangement. An advantage is that the heating means can be arranged to properly combust the gas and thus provide for an increased heating of the second side portion while at the same time taking care of potentially harmful unburned combustible gas.

According to an example embodiment, the gas tank arrangement may further comprise a valve arrangement arranged downstream the first fuel pump.

According to an example embodiment, the valve arrangement may be arranged in upstream fluid communication with the second fuel pump and the additional gas tank.

Hereby, the pressurized combustible gas from the first fuel pump can be controllably delivered to either the additional gas tank or the second fuel pump. For example, it may be especially advantageous to direct the pressurized combustible gas to the additional gas tank when the additional gas tank is substantially empty and there is a desire to increase the heat of the second side portion of the fuel pump propulsion arrangement.

According to an example embodiment, the gas tank arrangement may further comprise a heat exchanger arranged downstream the first fuel pump.

This is advantageous since the combustible gas can be provided into gas phase before entering the internal combustion engine.

According to an example embodiment, the heat exchanger may be arranged in fluid communication with the second side portion of the fuel pump propulsion arrangement.

As the second side portion is relatively warm, the heat therefrom can advantageously be used when vaporizing/heating the relatively colder compressed combustible gas from the first fuel pump. Hence, no additional heating means is necessary for achieving the heat exchanger effect of the heat exchanger.

According to an example embodiment, the heat exchanger may be arranged in downstream fluid communication with the second fuel pump.

An advantage is that it may be more energy efficient to pressurize a gas in liquid phase than to pressurize a gas in gas phase. Thus, by positioning the heat exchanger downstream the second fuel pump the heat exchanger heats the high-pressure combustible gas which thereby further increases it gas pressure before being delivered to the internal combustion engine.

According to an example embodiment, the second fuel pump may be mechanically connected to an internal combustion engine for propulsion thereof.

This is advantageous as the second fuel pump is positioned in close proximity to the internal combustion engine.

According to a second aspect of the present invention, there is provided a vehicle comprising an internal combustion engine and a gas tank arrangement according to any of the example embodiments described above in relation to the first aspect, wherein the gas tank arrangement is arranged in fluid communication with the internal combustion engine.

According to an example embodiment, the internal combustion engine may be a dual fuel internal combustion engine.

Effects and features of the second aspect are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
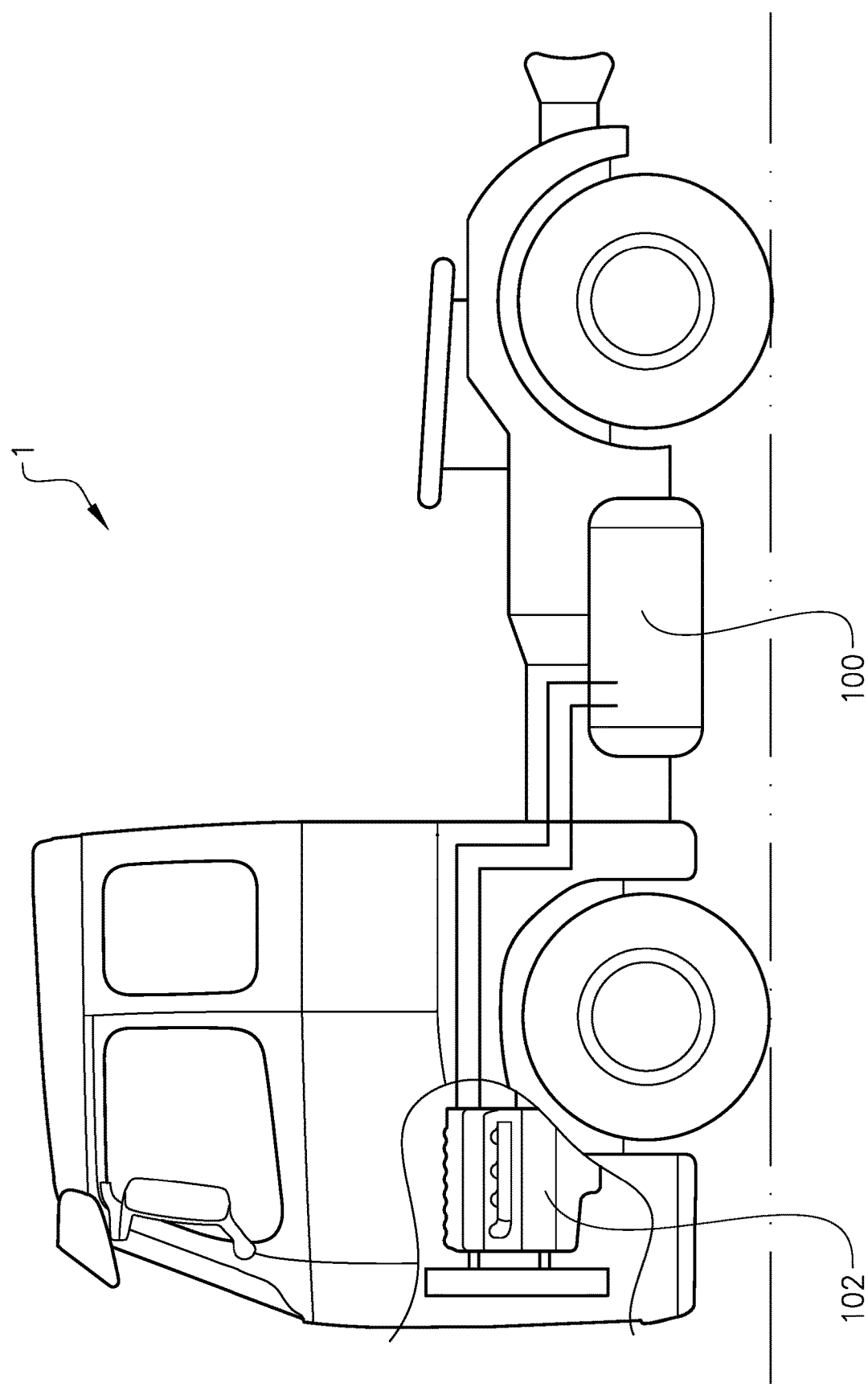
FIG. 1 is a lateral side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 comprising an internal combustion engine 102. The internal combustion engine 102 may, for example, be a dual fuel internal combustion engine 102 which is connected to a fuel tank, such as e.g. a diesel tank, and to a gas tank arrangement 100, which gas tank arrangement 100 will be described in further detail below in relation to the description of FIG. 2. The internal combustion engine 102 may thus be propelled by both conventional fuels such as e.g. diesel or petrol, as well as by a combustible gas such as e.g. compressed natural gas, DME, biogas, etc. The combustible gas may be provided either in a liquid phase i.e. a liquid/liquefied combustible gas, or in a gas phase. The vehicle 1 depicted in FIG. 1 is a heavy duty vehicle 1, here in the form of a truck, for which the inventive gas tank arrangement 100 is particularly suitable for.

Figure 2:
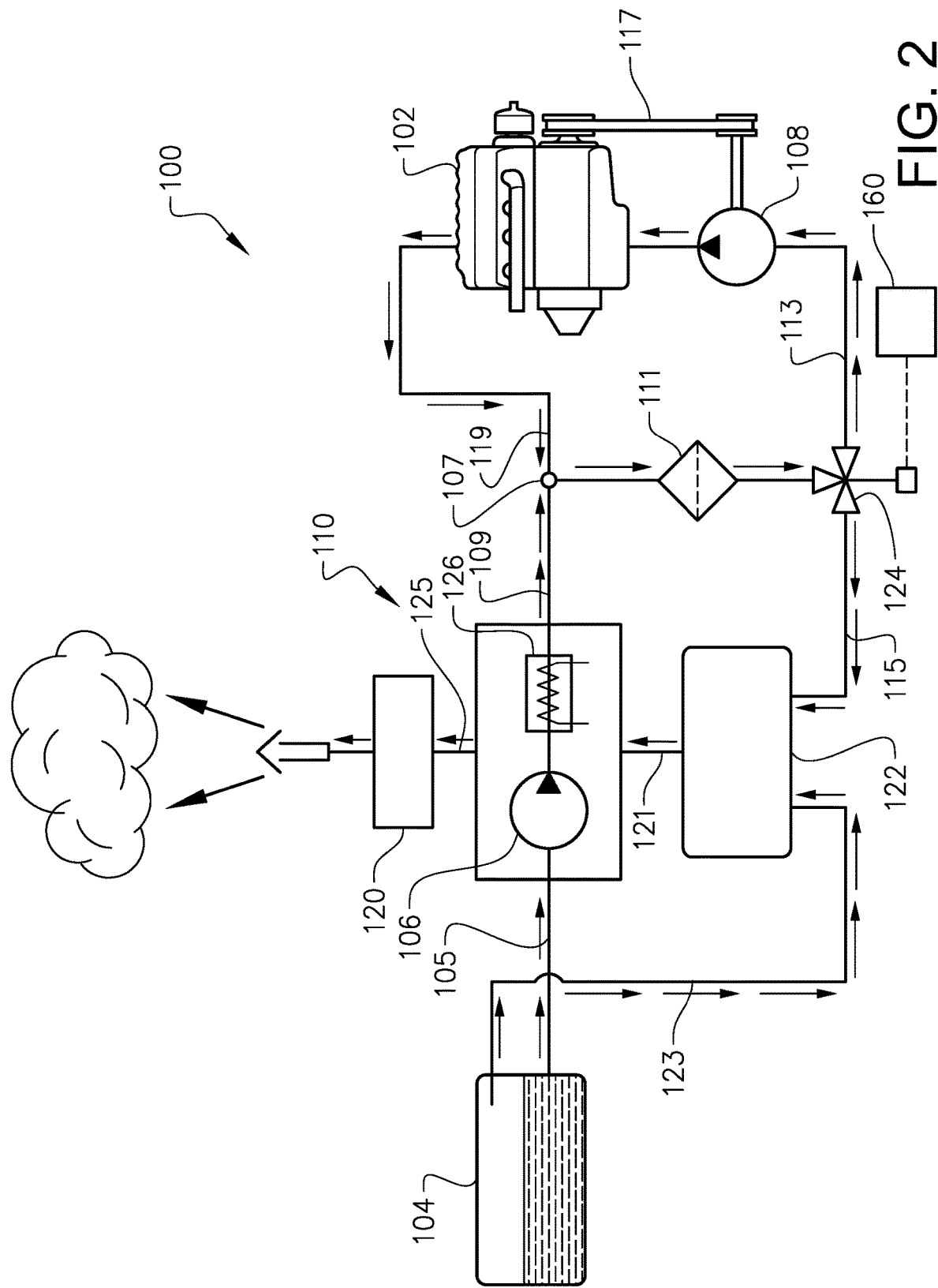
FIG. 2 is a schematic view illustrating an example embodiment of the gas tank arrangement according to the present invention.

Now, with reference to FIG. 2 an example embodiment of the gas tank arrangement 100 is depicted in further detail. In particular, the gas tank arrangement 100 comprises a gas tank 104. The gas tank 104 comprises a combustible gas which is suitable for propelling the internal combustion engine 102. A lower portion of the gas tank 104, in which combustible gas in liquid phase is present, is arranged in fluid communication with a first fuel pump 106, which in the following also will be referred to as a low pressure pump, via a first conduit 105. The first fuel pump 106 is arranged to pressurize the liquefied combustible gas to a first pressure level. As an example, the gas pressure in the gas tank 104 may be e.g. 10 bar, and the first fuel pump 106 may increase the pressure of the liquefied combustible gas to e.g. 50 bar. The first fuel pump 106 is thus arranged to pressurize and transport the liquefied combustible gas further downstream the gas tank arrangement 100. Also, the first fuel pump 106 is arranged to increase the pressure of the liquefied combustible gas to a gas pressure level which increases the transformation temperature at which liquefied combustible gas is transformed into combustible gas in gas phase. Hereby, there is a reduced need for isolation of the conduits of the gas tank arrangement 100.

Moreover, the first fuel pump 106 is connected and propelled by a fuel pump propulsion arrangement 110. An example embodiment of the fuel pump propulsion arrangement 110 will be given below in relation to the description of FIG. 3. As an alternative to the arrangement described below, the fuel pump propulsion arrangement 110 may be composed of e.g. an electric machine, or a combustion engine propelled by a combustible gas, etc. The main purpose of the fuel pump propulsion arrangement 110 is to propel the first fuel pump 106 so that the liquefied combustible gas can be pressurized as described above.

As depicted in FIG. 2, the gas tank arrangement 100 also comprises a heat exchanger 126. The heat exchanger 126 is arranged to transform the liquefied combustible gas into gas in gas phase. Hereby, combustible gas in gas phase can be further directed downstream the gas tank arrangement 100 towards the injectors (not shown) of the internal combustion engine 102. In FIG. 2, the heat exchanger 126 is illustrated as included in the fuel pump propulsion arrangement 110, i.e. forming part of the fuel pump propulsion arrangement 110. It should however be readily understood that the heat exchanger 126 may be positioned elsewhere downstream the first fuel pump 106 and upstream the injectors (not shown) of the internal combustion engine 102. According to another preferred example embodiment not illustrated in the drawings, the heat exchanger 126 may be positioned in fluid communication between a second fuel pump 108, which will be described below, and the internal combustion engine 102. Hence, in such a case, the heat exchanger 126 is arranged downstream the second fuel pump 108 and arranged to increase the gas in gas phase.

Furthermore, the gas tank arrangement 100 comprises a first valve 107, preferably a check valve, which is arranged downstream the fuel pump propulsion arrangement 110 via a second conduit 109. The first valve 107 is arranged to direct the combustible gas towards a filter 111 and further towards a valve arrangement 124. The valve arrangement 124 is preferably an electrically controlled valve arrangement which is connected to a control unit 160 and configured to controllably direct the combustible gas towards the second fuel pump 108 via a third conduit 113 and/or towards an additional gas tank 122 via a fourth conduit 115.

Accordingly, the second fuel pump 108, which is preferably configured as a high pressure fuel pump, is arranged downstream the valve arrangement 124. The purpose of the second fuel pump 108 is mainly to increase the pressure of the combustible gas to limits which substantially correspond to pressure levels suitable for the fuel injectors (not shown) of the internal combustion engine 102. As an example, the second fuel pump 108 may increase pressure level of the combustible gas to approximately 250 bar. An advantage is that it is desirable to achieve a relatively high gas pressure in the fuel injectors (not shown) as this will provide for a faster response time in the injection as well as achieving a higher compression in the cylinders at the time of injection. The second fuel pump 108 is in the example embodiment depicted in FIG. 2 propelled by the internal combustion engine 102 via a mechanical connection 117, such as a gear mechanism or the like.

Furthermore, the gas tank arrangement 100 also comprises a return conduit 119 from the internal combustion engine 102 to the first valve 107. The return conduit 119 is arranged in fluid communication between the internal combustion engine 102 and the first valve 107 for directing residual fuel from the internal combustion engine 102 back to the gas tank arrangement 100.

The gas tank arrangement 100 also comprises the above described additional gas tank 122. The additional gas tank 122 is arranged downstream the valve arrangement 124. Hereby, combustible gas can be controllably delivered to the additional gas tank 122, which additional gas tank 122 is, according to an example embodiment, a low pressure gas tank. According to a non-limiting example, the pressure level in the additional gas tank may be approximately 1-15 bar. The additional gas tank 122 is further arranged in upstream fluid communication with the fuel pump propulsion arrangement 110 via a fifth conduit 121. Hereby, the combustible gas in the additional gas tank 122 can be arranged for assisting in the propulsion of the fuel pump propulsion arrangement 110 as will be described further below in relation to FIG. 3.

Moreover, the gas tank arrangement 100 further comprises a sixth conduit 123 in fluid communication between the gas tank 104 and the additional gas tank 122. In detail, the sixth conduit 123 is connected to an upper portion of the gas tank 104 at which upper portion the combustible gas is provided in gas phase. Hereby, excessive boil off from the gas tank 104 can be delivered to the additional gas tank 122, which may reduce the gas pressure in the gas tank 104, etc.

As further depicted in FIG. 2, the gas tank arrangement 100 comprises an after treatment system 120 which is arranged in downstream fluid communication with the fuel pump propulsion arrangement 110 via a seventh conduit 125. Preferably, the after treatment system 120 is the same after treatment system connected downstream the internal combustion engine 102. According to an example embodiment, the after treatment system 120 may be a catalyst arranged to reduce the amount of harmful emissions.

Figure 3:
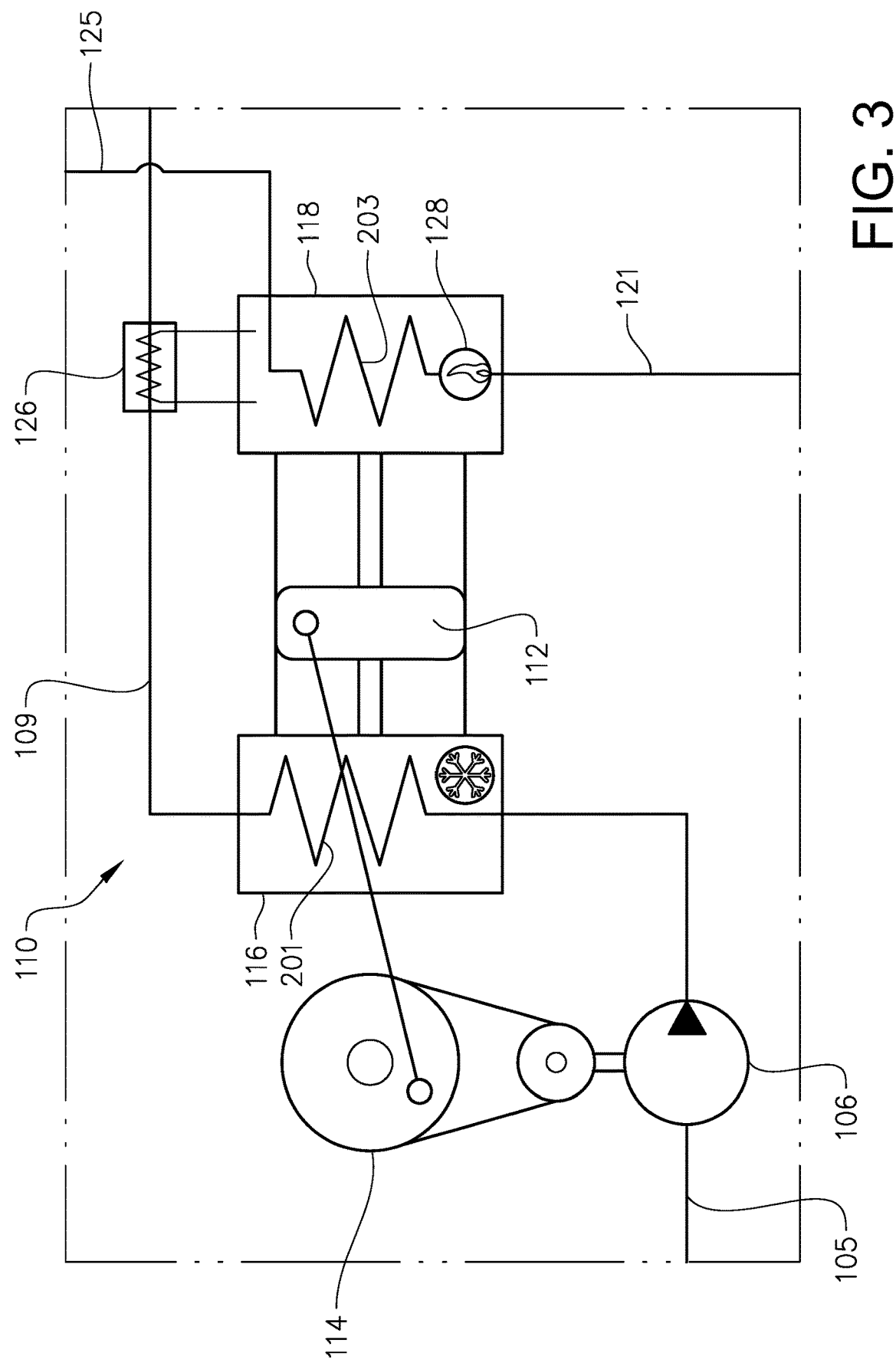
FIG. 3 is an example embodiment depicting the first fuel pump and the fuel pump propulsion arrangement of the gas tank arrangement in FIG. 2 according to an example embodiment of the present invention.

Turning now to FIG. 3, which illustrates an example embodiment of the above described fuel pump propulsion arrangement 110. The fuel pump propulsion arrangement 110 in FIG. 3 is substantially arranged as a Sterling engine which components and functionality will be described below. As depicted in FIG. 3, the fuel pump propulsion arrangement 110 comprises a piston 112 which is arranged to reciprocate between a first side portion 116 and a second side portion 118 of the fuel pump propulsion arrangement 110. The piston 112 is in turn connected to the first fuel pump 106 via a flywheel 114 for propelling the first fuel pump 106.

The first side portion 116, which is a "cold" portion of the fuel pump propulsion arrangement 110, is arranged in downstream fluid communication with the first fuel pump 106 which first fuel pump 106 is arranged in downstream fluid communication with the gas tank 104 as described above. Hereby, relatively cold combustible gas is directed to the first side portion 116 of the fuel pump propulsion arrangement 110. The relatively cold combustible gas from the gas tank 104 may be directed through the first side portion 116 by means of a first side portion conduit 201.

The second side portion 118, which is a "warm" portion of the fuel pump propulsion arrangement 110, is arranged in downstream fluid communication with the addition gas tank 122 via the fifth conduit 121. Hereby, combustible gas with a temperature higher than the temperature of the first side portion 116 is provided to the second side portion 118. The temperature of the combustible gas from the additional gas tank 122 may, for example, correspond to an ambient temperature. When, for example, there is a desire to increase the temperature of the second side portion 118, the combustible gas from the additional gas tank 122 can be directed through the second side portion 118 via a second side portion conduit 203. The second side portion conduit 203 is in further fluid communication with the after treatment system 120 via the seventh conduit 125.

Furthermore, the second side portion 118 may be provided with a heating means 128, such as e.g. a burner or other suitable means for increasing the temperature level of the combustible gases directed through the second side portion 118 of the fuel pump propulsion arrangement 110. This may be advantageous when there is a desire to reduce the amount of boil off in the system, whereby a gas flow can be provided into the second side portion conduit 203 and activate the heating means 128. As a non-limiting example, the heating means 128 may increase the temperature level of the combustible gas to approximately 900 degrees Celsius.

By means of the temperature difference between the first side portion 116 and the second side portion 118 of the fuel pump propulsion arrangement 110, the piston will reciprocate there between which in turn will create a rotational momentum on the flywheel 114 which will thus propel the first fuel pump 106.

Moreover, in the example embodiment depicted in FIG. 3, the heat exchanger 126 is arranged in communication with the second side portion 118 of the fuel pump propulsion arrangement 110. Hereby, the relatively warm side of the fuel pump propulsion arrangement 110 can be arranged to assist to transform the liquefied combustible gas into combustible gas in gas phase.

The fuel pump propulsion arrangement 110 may, as described above, be arranged as a Stirling engine. The power thereof can be controlled by changing the amount of combustible gas in the heating means 128. Thus, if increasing the amount of gas supplied, the output power from the fuel pump propulsion arrangement 110 may be increased.

It is to be understood that the present invention is not limited to the embodiment described above and illustrated in the drawings; rather, the skilled person will recognize that many changes and modifications may be made within the scope of the appended claims. For example, the fuel pump propulsion arrangement 110 may be provided with two pistons instead of the depicted single piston 112. In such case, one of the two pistons may be larger than the other piston.

The invention claimed is:

1. A gas tank arrangement for an internal combustion engine, the gas tank arrangement comprising:
    a gas tank for containing a combustible gas,
    a first fuel pump arranged downstream the gas tank and arranged to increase the pressure level of the combustible gas to a first pressure level, and
    a second fuel pump arranged downstream the first fuel pump and arranged to increase the pressure level of the combustible gas to a second pressure level,
    wherein the second pressure level is higher than the first pressure level,
    wherein the gas tank arrangement further comprises a fuel pump propulsion arrangement connected to the first fuel pump for propulsion thereof, and
    wherein the fuel pump propulsion arrangement comprises:
        a first side portion arranged in downstream fluid communication with the first fuel pump, and
        a second side portion,
        wherein a piston is arranged between the first side portion and the second side portion for providing a reciprocating motion there between for propelling the first fuel pump; and
        further comprising an additional gas tank is downstream fluid communication with the gas tank;
        wherein the additional gas tank is arranged in upstream fluid communication with the fuel pump propulsion arrangement.

2. The gas tank arrangement of claim 1, wherein the fuel pump propulsion arrangement comprises the piston, wherein the first fuel pump comprises a flywheel, the piston being mechanically connected to the flywheel for propulsion of the first fuel pump.

3. The gas tank arrangement of claim 1, wherein the second side portion comprises a heating means for heating the second side portion to a temperature higher than a temperature level of the first side portion.

4. The gas tank arrangement of claim 1, further comprising an after treatment system arranged in downstream fluid communication with the fuel pump propulsion arrangement.

5. The gas tank arrangement of claim 4, wherein the after treatment system is arranged in downstream fluid communication with the second side portion of the fuel pump propulsion arrangement.

6. The gas tank arrangement of claim 4, wherein the after treatment system is arranged in downstream fluid communication with an internal combustion engine.

7. The gas tank arrangement of claim 4, wherein the after treatment system is a catalyst.

8. The gas tank arrangement of claim 1, wherein the fuel pump propulsion arrangement is a Stirling engine.

9. The gas tank arrangement of claim 1, wherein the additional gas tank is in downstream fluid communication with the first fuel pump.

10. The gas tank arrangement of claim 9, further comprising a valve arrangement arranged downstream the first fuel pump.

11. The gas tank arrangement of claim 10, wherein the valve arrangement is arranged in upstream fluid communication with the second fuel pump and the additional gas tank.

12. The gas tank arrangement of claim 1, wherein the additional gas tank is arranged in upstream fluid communication with the second side portion of the fuel pump propulsion arrangement.

13. The gas tank arrangement of claim 1, further comprising a heat exchanger arranged downstream the first fuel pump.

14. The gas tank arrangement of claim 13, wherein the heat exchanger is arranged in fluid communication with the second side portion of the fuel pump propulsion arrangement.

15. The gas tank arrangement of claim 13, wherein the heat exchanger is arranged in downstream fluid communication with the second fuel pump.

16. The gas tank arrangement of claim 1, wherein the second fuel pump is mechanically connected to an internal combustion engine for propulsion thereof.

17. The gas tank arrangement of claim 1, wherein the gas tank arrangement is included in a vehicle comprising an internal combustion engine, wherein the gas tank arrangement is arranged in fluid communication with the internal combustion engine.

18. The gas tank arrangement of claim 17, wherein the internal combustion engine is a dual fuel internal combustion engine.

19. The gas tank arrangement of claim 1, further comprising a valve arrangement arranged downstream the first fuel pump.

* * * * *